May 11, 1948.  R. F. HAYS, JR  2,441,149
SERVO MOTOR CONTROLLING MEANS
Filed Nov. 29, 1943
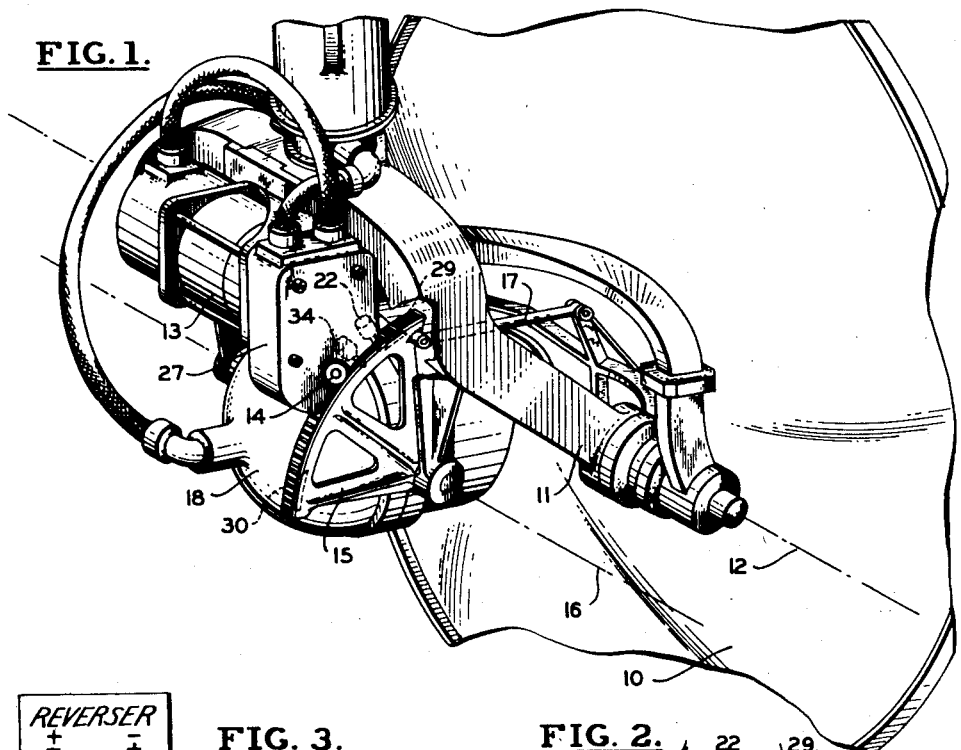
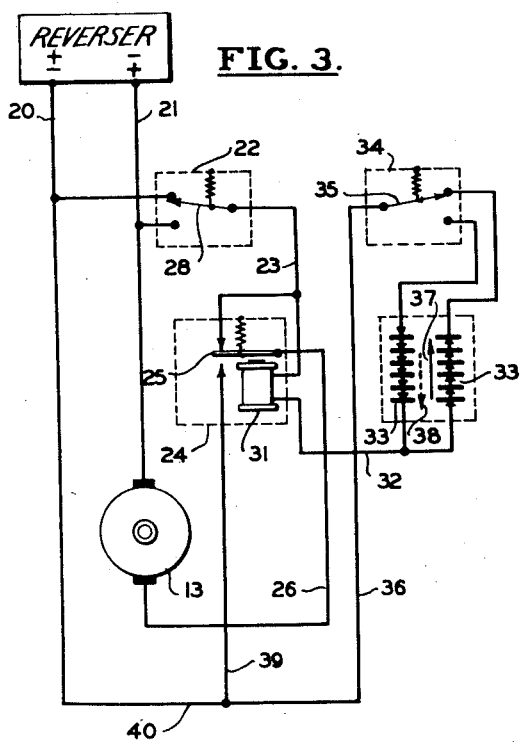
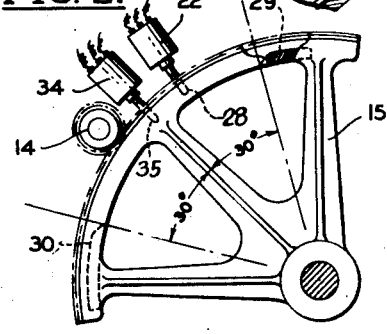
INVENTOR
ROBERT F. HAYS, JR.
BY
Herbert P. Thompson
his ATTORNEY.

Patented May 11, 1948

2,441,149

UNITED STATES PATENT OFFICE 2,441,149

SERVOMOTOR CONTROLLING MEANS

Robert Fred Hays, Jr., Syosset, N. Y., assignor to The Sperry Corporation, a corporation of Delaware Application November 29, 1943, Serial No. 512,147

7 Claims. (Cl. 318—267)

This invention relates generally to means for controlling a motor having an armature supplied by an operating voltage of reversible polarity and particularly to a control circuit for a servomotor of this character which confines the operating range thereof within predetermined limits.

The improved circuit is useful in a remote control system in which an object is driven by the servomotor. A controlling signal voltage of reversible polarity is impressed on the armature of the servomotor to operate the same in such a system, the direction of operation of the motor depending on the polarity of the voltage supplied thereto. The extent of operation of the motor is dependent on the type of object moved by the same. In one embodiment of this invention, positively actuated devices under control of the driven object are employed to limit the operation of the motor.

One of the features of the present invention resides in the provision of servomotor controlling means in the form of two motor circuits, one of which is normally closed and the other of which is normally open, with a shunting circuit for the normally closed motor circuit that is effective when the polarity of the voltage supplied the motor has changed to close the normally open motor circuit and restore the motor to operation. By shunting the primary motor circuit, movement of the object driven by the servomotor is positively limited. In the specific form of the invention shown, the normally closed motor circuit is positively opened by a switch that functions at the same time to close the shunt circuit. As specifically shown, a relay is used in the normally ineffective shunt circuit to close the normally open motor circuit. In previous circuits of this general character, a relay instead of a switch is utilized to open the primary motor circuit. With this arrangement, if the motor is coasting with a very small controlling voltage applied to its armature, the voltage is not sufficient to effect operation of the relay and the servomotor is not disconnected from the line. This results in damage to the equipment on which the system is employed.

Another feature of the invention resides in the utilization of rectifiers only in the shunt relay circuit. No rectifiers are employed in the armature circuit of the servomotor. This circuit carries only the energizing current for the normally ineffective relay and as this current flows only for the very short period of time required for operation of the relay, considerably smaller rectifiers may be used. Heretofore, it has been necessary to employ rectifiers of a considerable size in a circuit of this character as the same were used directly in the armature circuit of the servomotor.

Other features and structural details of the invention will be apparent from the following description when read in relation to the accompanying drawings wherein, Fig. 1 is a perspective view showing a practical embodiment of the invention adapted for use in a gyro stabilized antenna structure;

Fig. 2 is an enlarged detail view of the sector gear shown in Fig. 1; and

Fig. 3 is a wiring diagram showing the improved servomotor limiting circuit.

With reference to Fig. 1, the object driven by the servomotor in the illustrated system is the reflector of an antenna that receives or transmits electromagnetic energy at ultra high frequencies. Reflector 10 is pivotally mounted on a frame 11, the axis about which the same moves being indicated at 12. A servomotor as indicated at 13 is fixed in position on the frame in a suitable manner. As shown in Fig. 1, the servomotor 13 is adapted to drive a pinion 14 that meshes with a sector gear 15. The sector gear 15 is pivotally mounted on the frame 11 on an axis 16 that is parallel to the axis 12 of the reflector 10. A parallel motion transmitting link 17 connects the sector gear and reflector 10 so that movement of the sector gear by the pinion 14 through the driving effort of the servomotor causes corresponding movement of the reflector. In the present instance, the sector gear 15 moves with the casing 18 of a gyro-vertical instrument. Pinion 14 is also effective to move the casing 18 when the same drives the sector gear 15.

A pick-off (not shown) of conventional form is employed at the axis of the rotor case of the gyro-vertical instrument that is normally coincident with the axis 16 of the casing 18 which produces a voltage signal of reversible polarity. The pick-off or signal generator at the gyro instrument, in the present instance, produces a voltage whose magnitude and polarity, respectively, depend on the extent of angular displacement of casing 18 and the direction of such displacement from a normal position. The controlling voltage signal may be fed to the servomotor 13 by way of suitable leads 20, 21, the servomotor being responsive to the signal to drive pinion 14 so that the casing is moved in a direction that restores the same to a normal position where the pick-off has a null output. Due to link 17, the reflector 10 of the antenna is moved correspondingly so that the antenna is positioned about its axis 12 by means of the gyro-vertical instrument.

With reference to Figs. 2 and 3, the normally closed armature circuit for the servo motor is fed by an operating voltage of reversible polarity by way of lead 20, a normally effective switch 22 of a single pole double throw type, lead 23, a relay 24 of a single pole double throw type, lead 26 and lead 21. This circuit includes the armature 25 of the relay 24. Switch 22 is situated in a control box 27 fixed to one end of the casing of the servo motor 13, Fig. 1, the spring pressed movable arm 28 thereof being actuated by cams 29 and 30 located on the sector gear 15. Cams 29 and 30 and the switch 22 actuated thereby provide a means for opening the described armature circuit of the servo motor. This means also disconnects the servo motor from the line to limit the extent of the operation thereof. When sector gear 15 has been moved sufficiently as to render either cam 29 or 30 effective, the arm 28 of the switch is positively moved to engage the other contact of the switch which disconnects the servo motor from the line. On operation of relay 24, the normally open motor circuit is closed, and this closing serves to shunt the described normally closed armature circuit.

To return the servo motor to the line, a shunt circuit is employed that includes lead 21, arm 28 of switch 22, lead 23, the coil 31 of the relay 24, lead 32, a bank of rectifiers 33 arranged in parallel branches therein, a selective switch 34 whose movable arm 35 closes the circuit with only one of the parallel branches of rectifiers at a time, and return leads 36 and 40 to lead 20. The movable arm 35 of switch 34 is actuated only by control cam 30 on the sector gear. Switch 34 is also located in the control box 27 as shown in Fig. 1. The rectifiers provide a means for blocking the flow of energy in either direction in the restoring circuit for the servo motor and the switch 34 provides a means for selectively controlling the blocking means to render the circuit effective in one direction at a time. As shown in Fig. 3, the rectifiers 33 in the righthand bank permit flow of current in the restoring circuit only in the direction indicated by the arrow 37. The left bank of rectifiers 33 are effective when the movable arm 35 of switch 34 is actuated by cam 30 so that current can flow in the circuit only in the direction indicated by the arrow 38.

The elements of the shunt circuit are arranged so that with the cam 29 effective to operate the disconnecting switch 22, the rectifiers 33 therein prevent passage of current therethrough until the polarity of the controlling voltage for the servomotor reverses. With cam 29 effective the servomotor is definitely limited in its operation until a signal is obtained therefor that would drive it in the direction to move the sector gear clockwise as viewed in Fig. 2. When such a signal is received from the controlling pick-off, the shunt circuit then passes current, the coil 31 of relay 24 is energized and the armature 25 of the relay is moved to its other position so that a normally open motor circuit is closed. The normally open motor circuit includes lead 21, lead 26, relay armature 25, lead 39, lead 40 and lead 20. The operation of the servomotor shunting circuit is similar when cam 30 is effective to operate switch 22 except for the fact that this cam also causes operation of switch 34 to properly set the blocking means of the circuit. As soon as the servo motor has moved sector gear 15 sufficiently to permit the arm 28 of switch 22 to return to its normal position, the shunt circuit is opened and the primary armature circuit restored to its normal condition. The relay 24 provides a means for closing the normally open motor circuit. The shunt circuit provides a means effective upon reversal of the polarity of the operating voltage for the servomotor for controlling the operation of the relay.

Summarizing the operation of the entire circuit as it applies to the embodiment set forth therein, four basic operating conditions may exist, each attendant with the possibility of a reversal of current. The possible actions, in these four conditions will be described separately, each being governed by the condition of the switches 22 and 34 as they may be activated by cams 29 or 30. In the first condition, considered to be the normal operating condition, the application of current in one direction will cause the servomotor to turn the gear segment as it appears in Figure 2, clockwise; switch 22 will remain in its normal position as will switch 34 and the relay 24 has not been activated. A reversal of the applied current will cause the servomotor to reverse its direction, switches 22 and 34 remain as before. Thus, in this first condition, a change of applied current acts to change the direction of rotation of the servomotor. The second condition is one which exists when cam 29 acts on switch 22. In this condition, the clockwise direction of rotation is not affected, but an attempt to rotate the cam in a counterclockwise direction is blocked by rectifier 37. Switch 22 is in an unnormal position, switch 34 remains in a normal position, and the relay 24 is inactive. Thus, in this second condition it can be seen that only clockwise rotation may be effected and counterclockwise rotation is prevented. In condition three, the gear segment has travelled in a clockwise position until cam 30 acts on switch 34. In this position, switch 22 remains in a normal position, but switch 34 changes the possible flow of current now being connected to rectifier 38, heretofore unused. In this condition a change of current will still produce a change of direction of rotation in the servo. Rotating the cam further in a clockwise direction will cause cam 30 to act on switch 22 as well as 34 producing the fourth condition. In this condition, a flow of current tending to produce clockwise rotation will be prevented by rectifier 38. It may be noted that the relay 24 will be in an inactive status. However, change of direction of current permits passage of current through the rectifier 38 causing the relay to act and permitting the servomotor to turn in a counterclockwise direction. Thus, it is shown that it is necessary for cam 30 to rotate far enough to activate both switches, 34 and 22, before further rotation in a clockwise direction is prevented. Thereafter, a change of current is essential to any rotation and will cause rotation in a counterclockwise direction until switch 22 has moved off cam 30, thereby recreating condition three. Further rotation in a counterclockwise direction, until switch 22 is clear of cam 30, will place the system in the normal operating condition, earlier described as condition one.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Means for controlling a motor supplied by a voltage of reversible polarity comprising a normally closed motor circuit, a normally open motor circuit, a normally open circuit shunting said normally closed motor circuit, means for opening said normally closed motor circuit to stop the operation of the motor and for closing said shunt circuit, normally ineffective means in said shunt circuit for closing the normally open motor circuit to restore the motor to operation, and means included in said shunt circuit dependent upon reversal of the polarity of the voltage supplied the motor for rendering said last mentioned closing means effective.

2. Means for controlling a motor supplied by a voltage of reversible polarity comprising a normally closed motor circuit, a normally open motor circuit, a normally open circuit shunting said normally closed motor circuit, a switch operable to open said normally closed motor circuit to stop the operation of the motor and to close said shunt circuit, normally ineffective means in said shunt circuit for closing the normally open motor circuit to restore the motor to operation, and means included in said shunt circuit dependent upon reversal of the polarity of the voltage supplied the motor for rendering said closing means effective.

3. Means for controlling a motor supplied by a voltage of reversible polarity comprising a normally closed motor circuit, a normally open motor circuit, a normally open circuit shunting said normally closed motor circuit, means for opening said normally closed motor circuit to stop the operation of the motor and for closing said shunt circuit, a relay in said shunt circuit operable to close said normally open motor circuit and restore the motor to operation, and means included in said shunt circuit dependent upon reversal of the polarity of the voltage supplied the motor for rendering said relay operable.

4. Means for controlling a motor supplied by a voltage of reversible polarity comprising a normally closed motor circuit, a normally open motor circuit, a normally open circuit shunting said normally closed motor circuit, a switch operable to open said normally closed motor circuit to stop the operation of the motor and to close said shunting circuit, a normally ineffective relay in said shunt circuit for closing said normally open motor circuit to restore the motor to operation, and means included in said shunt circuit dependent upon reversal of the polarity of the voltage supplied the motor for rendering said relay effective.

5. Means for controlling a motor supplied by a voltage of reversible polarity comprising a normally closed motor circuit, a normally open motor circuit, a normally open circuit shunting said normally closed motor circuit, means for opening said normally closed motor circuit to stop the operation of the motor and for closing said shunt circuit, means for blocking the flow of energy in one direction in the shunt circuit, means for blocking the flow of energy in the other direction in the shunt circuit, means for selectively including one or the other of the blocking means in the circuit, the selected blocking means preventing energy from flowing in the shunt circuit until the polarity of the voltage supplied the motor changes, and means energized by said shunt circuit operable to close the normally open motor circuit to restore the motor to operation.

6. Motor controlling means as claimed in claim 5, in which said means for opening said normally closed motor circuit and for closing said shunt circuit is a switch, the means for selectively including one or the other of the blocking means in the circuit is a second switch, and the means energized by the shunt circuit is a relay.

7. Means for controlling a motor supplied by a voltage of reversible polarity comprising a normally closed armature circuit, a normally open armature circuit, a normally open circuit shunting said normally closed armature circuit, a switch operable to open said normally closed armature circuit to stop the operation of the motor and to close said normally open shunt circuit, rectifying means for preventing the flow of energy in one direction in the shunt circuit, rectifying means for preventing the flow of energy in the other direction in the shunt circuit, a second switch positioned to include one or the other of the rectifying means in the shunt circuit to prevent energy from flowing therein until the polarity of the voltage supplied the motor changes, and a relay energized by said shunt circuit operable to close the normally open motor circuit to restore the motor to operation.

ROBERT FRED HAYS, Jr.

REFERENCES CITED

The following references are of record in the file of this patent:

UNITED STATES PATENTS

| Number | Name | Date |
|---|---|---|
| 821,009 | Whittingham | May 22, 1906 |
| 1,805,160 | Bivens | May 12, 1931 |
| 2,331,003 | Smith | Oct. 5, 1943 |
| 2,342,089 | Rossman | Feb. 15, 1944 |